United States Patent Office 3,736,312
Patented May 29, 1973

3,736,312
PROCESS FOR POLYMERIZING CONJUGATED DIENE MONOMERS
Adel F. Halasa, Bath, Ohio, assignor to The Firestone Tire & Rubber Company, Akron, Ohio
No Drawing. Continuation-in-part of applications Ser. No. 854,273, Aug. 29, 1969, and Ser. No. 143,169, May 13, 1971, which is a continuation of application Ser. No. 854,286, Aug. 29, 1969, all now abandoned. This application June 7, 1971, Ser. No. 150,716
Int. Cl. C08d *3/04, 3/06, 3/08*
U.S. Cl. 260—94.2 T          22 Claims

ABSTRACT OF THE DISCLOSURE

Conjugated dienes are polymerized by a new catalyst system which permits control of the molecular weight and gives a more easily processed product. This catalyst system comprises (1) a lithium allyl compound having 3–10 carbon atoms, and (2) a sodium oxyhydrocarbon compound of 1–10 carbon atoms in which the hydrocarbon portion can be a tertiary alkyl radical, but is preferably a secondary alkyl radical, or a potassium tertiary alkoxide of 4–10 carbon atoms. The diene polymers produced by this process have controllable molecular weights in the range of 5,000 to 1,000,000, preferably 100,000 to 500,000, broad molecular weight distribution, high glass transition temperatures, high degree of branching and are more easily processed in the production of rubber and other compositions for commercial use.

---

This application is a continuation-in-part of copending application Ser. No. 854,273, filed Aug. 29, 1969, now abandoned, and of copending application Ser. No. 143,-169 filed May 13, 1971, now abandoned, which latter application is a continuation of application Ser. No. 854,286, filed Aug. 29, 1969, now abandoned.

BACKGROUND OF THE INVENTION

Field of the invention

This invention relates to a process for the polymerization of dienes using a catalyst composition comprising a lithium allyl compound and a sodium alkoxide or aryloxide or a potassium tertiary-alkoxide.

Related prior art

The polymerization of conjugated dienes can be effected in a variety of methods. However, there are various disadvantages in the various methods presently known including undesirable or uncontrollable properties in the products, such as lack of control of molecular weight, molecular weight distribution and processability of the polymers. For example, the so-called "Alfin" catalyst system which has been studied extensively produces polybutadienes of approximately 5,000,000 molecular weight, or even higher, which are difficult to process for commercial use. This catalyst system generally comprises allyl sodium, sodium isopropoxide and sodium chloride. There are a number of literature references describing the Alfin process, typical of which is the review article in Rubber Age, vol. 94, October 1963, pp. 87–92.

This Alfin catalyst system effects very rapid formation of a very high molecular weight polymer having molecular weights of about 5,000,000 with about 75% of the polymer in the trans-1,4 configuration. In contrast, polymerization by an alkyl sodium, such as amyl sodium, produces a much slower polymerization reaction to give a polymer having as high as 70% in the 1,2- configuration, but with a molecular weight too low for the desired properties.

Polybutadienes prepared by the use of n-butyl lithium in n-hexane have about 8–10%, 1,2-, 53–54% trans-1,4 and 35–37% cis-1,4- configurations, which polymers do not have enough 1,2- configuration for the desired properties. By using polar modifiers or solvents, such as ethers, amines, etc., the vinyl content can be increased up to 50–70%. However, the molecular weight distribution in such cases is so narrow as to give poor processability. Moreover, the polar modifiers act as chain terminators and prevent active polymer products that might be coupled or otherwise post-treated to improve processability. Processability is very important for commercial rubber tire production. Among other disadvantages poor processability results in poor adhesion to fillers and thereby gives poor reinforcement.

High glass transition temperatures in butadiene polymers generally indicate and accompany good wet traction. Butadiene emulsion polymers have low glass transition temperatures and have poor wet traction when fabricated into tires.

SUMMARY OF THE INVENTION

In accordance with the present invention, it has now been found that conjugated diene polymers of controllable molecular weight, broad molecular weight distribution, good processability, high glass transition temperatures and good wet traction are produced by use of a catalyst system comprising the combination of (1) a lithium allyl compound and (2) a sodium secondary or tertiary alkoxide or a potassium tertiary-alkoxide of 4–10 carbon atoms. A third component, namely a lithium halide, can be present in the catalyst system depending on the method used in preparing the lithium allyl.

The hydrocarbon portion of the lithium allyl compound has 3–10 carbon atoms, and even though larger groups can be used, there is no particular advantage. The lithium can be attached to a primary, secondary or tertiary carbon atom provided it is adjacent to the ethylenic radical and activated thereby for metalation. This compound is prepared by the reaction:

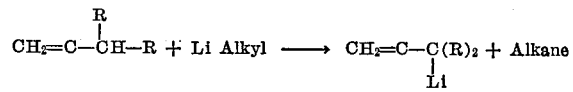

wherein R can be hydrogen or alkyl with the total number of carbon atoms in the two R groups being no more than 7, and the alkyl or the lithium alkyl having 1–10 carbon atoms.

In cases where it is desired to prepare the lithium allyl compound free of the byproduct lithium chloride or bromide, this can be done by preparing it in a liquid which is a solvent for the lithium allyl but not for the lithium chloride or bromide, such as diethyl ether, tetrahydrofuran, or other ether. (Or the lithium allyl can be prepared in hexane and then separated from the accompanying salt by ether extraction.) Then after the salt has been separated from the solution by decantation or filtration, a higher boiling hydrocarbon is added and the ether removed by distillation, using reduced pressure to keep the temperature low.

In the sodium alkoxide and in the potassium tertiary-alkoxide, the hydrocarbon portion advantageously has 4–10 carbon atoms. While even larger groups can be used, again there is no added advantage, and the resultant compounds are more sluggish in their activity.

The sodium alkoxide is prepared by the reaction of metallic sodium with a secondary or tertiary alcohol, and the potassium-tertiary-alkoxide is prepared by the reaction of metallic potassium with a tertiary alcohol. This can be prepared separately and excess metal used to insure that no unreacted alcohol remains to react with the lithium or lithium allyl upon mixture of the sodium alkoxide or potassium t-alkoxide therewith. Some sodium alkoxides, such as t-butoxide, are available commercially.

In this catalyst combination, the system is most active when there are two moles of the sodium alkoxide or potassium t-alkoxide per mole of the lithium allyl. If there is a mole per mole ratio, the catalyst is unsuitable, and if there is a considerable excess of the alkoxide over the 2–1 mole ratio, the catalyst is much less effective compared with the 2–1 optimum ratio. However, as the ratio decreases or increases from this optimum amount, there is some activity since there will be at least a portion of the lithium allyl compound associated with two moles of the alkoxide or aryloxide. Consequently, it is desirable to keep within the range of 1.5–2.5 moles of sodium alkoxide or aryloxide or potassium t-alkoxide per mole of lithium allyl.

If a lithium chloride or bromide is present, it is generally in the amount deposited by the reaction of lithium with the halohydrocarbon by which the intermediate lithium hydrocarbon is formed, so that generally there is a mole of lithium chloride or bromide per mole of lithium allyl.

The catalyst can be prepared at room temperature, but preferably at 0° C. or even lower.

The effectiveness of the lithium allyl compound as an active component in the present catalyst system is surprising, particularly in view of the teaching against the use of lithium components in the A. A. Morton et al. article in Industrial and Engineering Chemistry, 44, No. 12, page 2876 (1952), where it is stated, "The lithium ion cannot be used in general without impairment of activity, . . ." and in Table II on page 2877 the activity for LiF, LiCl and LiBr is indicated as "N" or "None," apparently with allyl sodium and sodium isopropoxide.

Typical allyl groups that can be attached to the lithium in the lithium allyl compound include

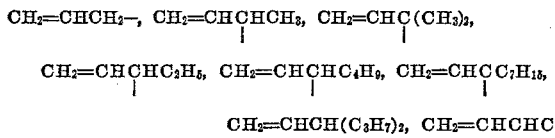

and the like. Of these the allyl compound is preferred for several reasons including greater efficiency and yields.

Typical sodium alkoxide compounds that can be used include compounds in which the hydrocarbon portion is isopropyl, sec.-butyl, t-butyl, sec.-amyl, t-amyl, sec.-hexyl, t-hexyl, 1,1,4-trimethyl-pentyl, 1-methyl-2,4-diethylpentyl, cumyl, 1-methyl-1-phenylpropyl, and the like.

Typical potassium tertiary-alkoxides that are suitable include those in which the hydrocarbon portions are t-butyl, t-amyl (or 1,1-dimethyl-propyl), 1,1,4-trimethylpentyl, 1-methyl-1,4-diethyl-pentyl, cumyl, 1-methyl-1-phenyl propyl, etc.

The catalyst is used in a proportion of 0.1 to 4 millimoles per 100 grams of monomer. The polymerization temperature is advantageously no higher than 125° C., and is preferably no higher than 70° C. While higher temperatures can be used, the vinyl content of the polymer decreases when temperatures exceed 70° C.

Polybutadienes produced at temperatures of 125° C. or lower have molecular weights as high as 1,000,000, generally 100,000 to 500,000. Yields as high as 98–99% are easily produced. The 1,2- configuration in the polymer is at least 35% and generally in the range of 35 to 50% when the temperature does not exceed 70° C. It has been found that desirable wet traction or skid resistance properties require at least 35% 1,2- configuration in the polymers. In contrast corresponding emulsion polymers, which have low glass transition temperatures (−55 to −59° C.), also have poor wet traction properties. These polymers have 20–25% 1,2- configuration and 75–80% trans-1,4.

The polymerization is advantageously effected in the presence of an inert diluent to facilitate handling of the polymer and to give better temperature control. Normally liquid hydrocarbons are preferred for this purpose, such as benzene, toluene, saturated aliphatic hydrocarbons preferably of the straight chain variety, such as n-hexane and n-heptane, etc. However, where provision is made for heat dissipation and control, the solvent can be omitted.

The polymerization is advantageously conducted in a pressure vessel to avoid loss of monomer and solvent, particularly if temperatures are to be used at or above the boiling point of either. Advantageously the polymerization temperature is no higher than 125° C. since higher temperatures give progressively lower vinyl content with increase in temperature.

Conjugated dienes that may be polymerized in accordance with this invention include: 1,3-butadiene, isoprene, chloroprene, 2-phenyl-1,3-butadiene, piperylene, etc.

Although butadiene homopolymers are preferred in the practice of this invention, butadiene copolymers can also be used where the comonomers impart desirable properties and do not detract from the polymer properties. The comonomers are preferably olefins, such as butene-1, n-butene-2, isobutylene, n-pentene-1, n-pentene-2 and the like, and also including vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4-chloronaphthalene, 1-isopropenyl-5-chloronaphthalene, vinyl diphenyl, vinyl diphenylethane, 4-vinyl-4'-methyl-diphenyl, 4-vinyl-4'-chlorodiphenyl, and the like. Preferably such comonomers have no more than 12 carbon atoms. Where such comonomers are to be used, generally at least 1%, preferably at least 5% by weight should be used and as much as 60%, preferably no more than 30% may be used.

In referring herein to millimoles of catalyst this corresponds to gram millimoles of lithium allyl since the catalyst is regarded or at least calculated as a complex of the sodium alkoxide or aryloxide and the lithium allyl.

The "dilute solution viscosity" referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined from these viscosities and are the number average molecular weights.

SPECIFIC EMBODIMENTS OF INVENTION

The invention is illustrated by the following examples which are intended merely for the purpose of illustration and are not to be regarded as limiting the scope of the invention nor the manner in which it may be practiced. Unless specifically indicated otherwise, parts and percentages are given by weight.

EXAMPLE I

To a 3-necked flask which is equipped with a high speed air stirrer, a nitrogen gas-inlet, a Dry Ice reflux condenser and an external bath (maintained at −10° C.), there is added 800 ml. of dry hexane and then 71 ml. of a 30% dispersion of lithium in mineral oil (containing 6.3 gm. or 0.9 gram atoms of metallic lithium). This slurry is cooled to −10° C. and 41.6 gm. (0.45 mole) of dry n-butyl chloride is added slowly with high speed agitation. After the addition of the n-butyl chloride, the reaction mixture is stirred continuously for about 60 minutes. At the end of this time, 86.4 gm. (0.9 mole) of sodium t-butoxide is added. The resultant mixture is stirred for an additional 30 minutes at −10° C., then the temperature is raised gradually to room temperature and pressurized with propylene to give a slurry of lithium allyl, sodium t-butoxide and lithium chloride in hexane.

EXAMPLE II

In an alternative procedure the catalyst can be prepared by adding 86.4 gms. of sodium t-butoxide to the suspension of lithium-mineral oil-hexane as in Example I but *prior* to the addition of the n-butyl chloride. After the NaOtBu is added, the mixture is stirred and then the n-butyl chloride is added gradually with the stirring continued for about 60 minutes after the n-butyl chloride addition is completed. The catalyst is then ready for use.

EXAMPLE III

To a moisture-free reactor which has been flushed with dry nitrogen, there is added 1,584 gms. of a hexane solution containing 365.9 gms. of butadiene. The solution is stirred for about ten minutes at 30° C. and 5.592 millimoles of catalyst prepared as described in Example I or Example II is added with a hypodermic syringe under 50 lbs. of nitrogen pressure at 30° C. After about four hours, a reddish polymer is obtained. This is collected by pouring the mixture into a large amount of methanol and 20 ml. of an antioxidant, such as p-phenylenediamine. The polymer is dried and a polymer yield of 365.3 gms. of 98% of theoretical is obtained. The molecular weight of the polymer is approximately 500,000.

EXAMPLE IV

The procedure of Example III is repeated a number of times using in one case an Alfin catalyst prepared according to the procedure described by Hansley and Greenberg in Rubber Journal, 146, 42 (1964), and in other cases the procedure of Example III is repeated identically, in one case using the same temperature, namely 30° C., and in other cases using temperatures of 50°, 70°, 100° and 125° C. respectively. Other conditions and results are tabulated below in Table I. As will be noted, the molecular weight of the Alfin-catalyzed polymer, as indicated by the high dilute solution viscosity (DSV), is much higher than for the polymer produced with the catalyst system of this invention. It will also be noted that, whereas the Alfin catalyst produces a polymer having 20% 1,2- configuration, the polymers produced by the catalyst system of this invention range from 51% to 56% of this configuration. It will also be noted that the higher temperatures cause a slight reduction in the percent of 1,2- microstructure.

and tested with standard laboratory traction devices, the new polymer of this invention registers about 21% improvement over the commercial type on the medium and high coefficient of friction surfaces. The composition with the new polymer has a faster cure rate, which results in a slightly higher modulus and tensile strength and a lower running temperature than the commercial type. The recipe used for the testing composition is: 100 (parts) polymer; 70 ISAF Black; 43 oil; 2.5 ZnO; 2.0 stearic acid; 1.0 Santoflex 13; 1.7 sulfur; 1.4 Cyclix B. This is cured for 30 minutes at 300° F. and gives the following test results.

| | Commercial type | New polymer |
|---|---|---|
| Stanley-London Wet Skid Resistance Index: | | |
| Surface CF 0.09 | 100 | 100 |
| Surface CF 0.39 | 91 | 112 |
| Surface CF 0.54 | 89 | 107 |
| Young's Bending Modulus (cured 30 minutes at 300° (F.) Index: At 10,000 p.s.i., ° C | −71 | −49 |

EXAMPLE VI

To a 3-necked flask which is equipped with a high speed air stirrer, a nitrogen gas-inlet, a Dry Ice reflux condenser and an external bath (maintained at −10° C.), there is added 800 ml. of dry hexane and then 15 ml. of a 40% dispersion of lithium in mineral oil (containing 5.83 gm. of metallic lithium). This slurry is cooled to −10° C. and 38.9 gm. of dry n-butyl chloride is added slowly with high speed agitation. After the addition of the n-butyl chloride, the reaction mixture is stirred continuously for about 60 minutes. At the end of this time, 89.6 gm. of potassium t-butoxide is added. The resultant mixture is stirred for an additional 30 minutes at −10° C. followed by bubbling in a stream of dry propylene for 30 to 40 minutes. The catalyst is then transferred into 28-oz. beverage bottles and pressurized with 40 to 50 lbs. of propylene. This process is repeated at room temperature until the pressure of propylene is maintained steadily for 24 hours without dropping. The excess propylene is then vented and the slurry is ready for use as polymerization catalyst.

EXAMPLE VII

It is also possible to reverse the order of addition of the reagents in Example VI. This is done by adding the potassium t-butoxide to the suspension of lithium-mineral oil-hexane *prior* to the addition of the n-butyl chloride. After the KOtBu is added, the mixture is stirred and then

TABLE I

| | | | | | I.R. | | |
|---|---|---|---|---|---|---|---|
| Catalyst | Temp. (° C.) | Mmole cat./ g. monomer | DSV | Percent gel | Cis 1,4 percent | Trans 1,4 percent | 1,2 percent |
| Alfin | 30 | 1.8/60 | 13.5 | 0 | 10 | 70 | 20 |
| LiAllyl·NaOtBu | 30 | 0.932/60 | 2.5 | 0 | 12 | 35 | 53 |
| Do | 50 | 0.932/60 | 2.25 | 0 | 14 | 30 | 56 |
| Do | 70 | 0.932/60 | 2.30 | 0 | 15 | 32 | 53 |
| Do | 100 | 0.932/60 | 2.10 | 0 | 12 | 36 | 52 |
| Do | 125 | 0.932/60 | 2.0 | 0 | 11 | 38 | 51 |

EXAMPLE V

Comparative tests are made on a polybutadiene prepared according to Example III and a butyl lithium-catalyzed polybutadiene of a type being used commercially for tire production. The polymer produced according to this invention shows a bulk viscosity almost three times as high as the commercial type butyl lithium-catalyzed polybutadiene. However the new polymer shows only slightly higher inherent viscosity measurements than for the commercial type. This information together with the respective molecular weight distribution determinations shows that the polymers of this invention are highly branched. Moreover, the overall processability characteristics of this polymer are better than the corresponding characteristics of the compared commercial type. When the respective polymers are blended respectively in a standard oil recipe the n-butyl chloride is added gradually with the stirring continued for about 60 minutes after the n-butyl chloride addition is completed, then propylene gas is introduced for 30-40 minutes until the propylene begins to reflux through the Dry Ice condenser. The catalyst is then ready for use.

EXAMPLE VIII

To a moisture-free reactor which has been flushed with dry nitrogen, there is added 1584 gm. of a hexane solution containing 365.9 gm. of butadiene. The solution is stirred for about 10 minutes at 30° C. and 5.592 millimoles of catalyst prepared as described in Example VI or Example VII is added with a hypodermic syringe under 50 lbs. of nitrogen pressure at 30° C. The system is immediately closed and the bottle rotated in a polymerization bath maintained at 30° C. for about four hours.

The resultant polymer is collected by pouring the mixture into a large amount of methanol and 20 ml. of an antioxidant, such as p-phenylenediamine. The polymer is dried and a polymer yield of 98% of theoretical is obtained. The molecular weight of the polymer is approximately 500,000.

EXAMPLE IX

The procedure of Example VIII is repeated a number of times using in one case an Alfin catalyst prepared according to the procedure described by Hansley and Greenberg in Rubber Journal, 146, 42 (1964), and in other cases the procedure of Example VIII is repeated identically, in one case using the same temperature, namely 30° C., and in other cases using temperatures of 50°, 70°, 100° and 125° C. respectively. Other conditions and results are tabulated below in Table II. As will be noted, the molecular weight of the Alfin-catalyzed polymer, as indicated by the high dilute solution viscosity (DSV), is much higher than for the polymer produced with the catalyst system of this invention. It will also be noted that, whereas the Alfin catalyst produces a polymer having 20% 1,2 configuration, the polymers produced by the catalyst system of this invention range from 44.7% to 51.3% of this configuration. It will also be noted that the higher temperatures cause a reduction in the percent of 1,2 microstructure. Therefore, it is generally desirable to use temperatures no higher than about 40° C.

TABLE II

| Catalyst | Temp. (° C.) | Mmole cat./ g. monomer | DSV | Percent gel | I.R. Cis 1,4 percent | I.R. Trans 1,4 percent | I.R. 1,2 percent |
| --- | --- | --- | --- | --- | --- | --- | --- |
| Alfin | 30 | 1.8/60 | 13.5 | 0 | 10 | 70 | 20 |
| LiAllyl-KOtBu | 30 | 0.932/60 | 3.5 | 0 | 11 | 39.5 | 49.5 |
| Do | 50 | 0.932/60 | 3.6 | 0 | 14 | 34.7 | 51.3 |
| Do | 70 | 0.932/60 | 3.0 | 0 | 16 | 36.5 | 47.5 |
| Do | 100 | 0.932/60 | 2.9 | 0 | 13 | 41.3 | 45.7 |
| Do | 125 | 0.932/60 | 2.50 | 0 | 12 | 43.3 | 44.7 |

EXAMPLE X

Comparative tests are made on a polybutadiene prepared according to Example VIII and a butyl lithium-catalyzed polybutadiene of a type being used commercially for tire production. The polymer produced according to this invention shows a bulk viscosity almost three times as high as the commercial type butyl lithium-catalyzed polybutadiene. However, the new polymer shows only slightly higher inherent viscosity measurements than for the commercial type. This information together with the respective molecular weight distribution determinations shows that the polymers of this invention are highly branched. Moreover, the overall processability characteristics of this polymer are better than the corresponding characteristics of the compared commercial type. When the respective polymers are blended respectively in a standard oil recipe and tested with standard laboratory traction devices, the new polymer of this invention registers about 20% improvement over the commercial type on the medium and high coefficient of friction surfaces. The composition with the new polymer has a faster cure rate, which results in a slightly higher modulus and tensile strength and a lower running temperature than the commercial type. The recipe used for testing the composition is: 100 (parts) polymer; 70 ISAF Black; 43 oil; 2.5 ZnO; 2.0 stearic acid; 1.0 Santoflex 13; 1.7 sulfur; 1.4 Cyclix B. This is cured for 30 minutes at 300° F. and gives the following test results.

| | Commercial type | New polymer |
| --- | --- | --- |
| Stanley-London Wet Skid Resistance Index: | | |
| Surface CF 0.09 | 100 | 101 |
| Surface CF 0.39 | 91 | 95.3 |
| Surface CF 0.54 | 89 | 92.2 |
| Young's Bending Modulus (cured 30 minutes at 300° F.) Index: At 10,000 p.s.i., ° C. | −71 | −61.4 |

EXAMPLE XI

The procedures of Examples I–III and VI–VIII are repeated with similar results using equivalent amounts of other lithium allyls as follows:

(a) 3-Li-butene-1
(b) 3-Li-n-pentene-1
(c) 3-Li-3,3-dimethyl-propene-1
(d) 3-Li-3-ethyl-n-hexene-1
(e) 3-Li-4-ethyl-n-hexene-1
(f) 3-Li-3-phenyl-n-butene-1

EXAMPLE XII

The procedures of Examples I–III are repeated with similar results using in place of the sodium t-butoxide equivalent weights respectively of:

(a) Sodium t-amyloxide
(b) Sodium sec.-butoxide
(c) Sodium cumyloxide
(d) Potassium t-amyloxide
(e) Potassium 2-oxy-2,5-dimethylhexane
(f) Potassium cumyloxide

EXAMPLE XIII

The procedures of Examples I–III and VI–VIII are repeated a number of times using in place of the butadiene an equivalent weight respectively of:

(a) Isoprene
(b) Chloroprene
(c) Piperylene
(d) 2-phenyl-1,3-butadiene
(e) 75–25 mixture of butadiene and styrene
(f) 70–30 mixture of butadiene and vinyl toluene
(g) 80–20 mixture of butadiene and n-butene-1
(h) 70–30 mixture of butadiene and isoprene
(i) 75–25 mixture of isoprene and n-hexene-1

EXAMPLE XIV

The procedures of Examples I–III and VI–VIII are repeated with similar results using in place of the hexane an equivalent amount respectively of: benzene, toluene, n-octane, cyclohexane and methylcyclohexane.

EXAMPLE XV

To a 28-oz. flask flushed out with nitrogen is added 600 ml. of an n-BuLi solution containing 1.0 mole of n-BuLi and 1.0 mole of N,N,N',N'-tetramethyl-ethylene-diamine. The flask is then charged with 45 gm. of propylene. The resultant red precipitate of allyl lithium is filtered and washed several times with hexane under a nitrogen atmosphere. Analysis shows 99.9% Li and 99% allyl. The allyl lithium is then suspended in hexane for use as catalyst in the subsequent examples.

EXAMPLE XVI

A number of 28-ounce polymerization bottles are charged and polymerizations of butadiene effected at 30° C. for 4 hours as in Example III. The charge consists of 60 gm. of butadiene in 260 gm. of hexane solution. This is added to the moisture free bottle after it has been flushed with nitrogen. The bottle is sealed and brought to a temperature of 30° C. Using the allyl Li prepared in Example XV, the halide-free catalyst mixture is added under 50 p.s.i. of nitrogen pressure by a hypodermic syringe inserted through the rubber liner in the sealing cap of the bottle. The bottle is rotated for 4 hours in a polymerization bath maintained at 30° C. The catalyst compositions and results are given in the table below. (The specific metal alkoxides (halide-free) are available commercially or may be prepared by the addition of the stoichiometric amount of the appropriate alcohol to a mineral oil suspension of the finely divided metal.) A yield of approximately 100% polymer is obtained in each case.

| LiAllyl·NaO-t-Bu (halide-free) | Temp. (° C.) | Mmole cat./ 60 gm. monomer | DSV | Mol. wt. | Percent 1,2 | $T_g$ (° C.) |
|---|---|---|---|---|---|---|
| Mole/mole | 50 | 1.0 | 1.5 | 152,000 | 42 | −63 |
| Do | 50 | 2.0 | 1.2 | 112,000 | 47.5 | −60 |

The products are gel free and have excellent processability.

EXAMPLE XVII

The procedure of Example XVI is repeated using a place of the NaO-t-Bu an equivalent weight of Na isopropoxide with the following results:

| LiAllyl·NaOCH(CH₃)₂ (halide-free) | Temp. (° C.) | Mmole cat./ 60 gm. monomer | DSV | Mol. wt. | Percent 1,2 | $T_g$ (° C.) |
|---|---|---|---|---|---|---|
| Mole/mole | 50 | 1.0 | 1.6 | 163,000 | 43 | −62 |
| Do | 50 | 2.0 | 1.3 | 125,000 | 46 | −59 |

The products are gel free and have excellent processibility.

EXAMPLE XVIII

The procedure of Example XVI is repeated using 1.0 millimole of KO-t-Bu in place of the NaO-t-Bu with the following results:

| LiAllyl·KO-t-Bu (halide-free) | Temp. (° C.) | Mmole cat./ 60 gm. monomer | DSV | Mol. wt. | Percent 1,2 | $T_g$ (° C.) |
|---|---|---|---|---|---|---|
| Mole/mole | 50 | 1.0 | 2.3 | 212,000 | 43 | −63 |
| Do | 50 | 2.0 | 1.5 | 152,000 | 48 | −60 |

EXAMPLE XIX

The procedure of Example XVI is repeated using equivalent millimoles of K t-amyloxide in place of the NaO-t-Bu with the following results:

| LiAllyl·KO t-Am (halide-free) | Temp. (° C.) | Mmole cat./ 60 gm. monomer | DSV | Mol. wt. | Percent 1,2 | $T_g$ (° C.) |
|---|---|---|---|---|---|---|
| Mole/mole | 50 | 1.0 | 2.2 | 205,000 | 42 | −62 |
| Do | 50 | 2.0 | 1.4 | 148,000 | 47.5 | −59 |

EXAMPLE XX

The procedure of Example XVIII is repeated using as the monomer a mixture of 75% butadiene and 25% styrene with the following results:

| LiAllyl·KO-t-Bu (halide-free) | Temp. (° C.) | Mmole cat./ 60 gm. monomer | DSV | Percent block | Percent 1,2 | $T_g$ (° C.) | Mol. wt. |
|---|---|---|---|---|---|---|---|
| Mole/mole | 50 | 1.0 | 2.0 | 0 | 42.5 | −40 | 200,000 |
| Do | 50 | 2.0 | 1.3 | 0 | 47 | −42 | 125,000 |

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for the hydrocarbon solution polymerization of a monomer composition containing at least 70 percent conjugated diene to produce a polymer in which the diene is at least 35 percent in the 1,2-configuration and the remainder is predominantly in the trans-1,4 configuration and a molecular weight of about 25,000 to 500,000 comprising the steps of maintaining said monomer composition at a temperature of no more than 125° C. in intimate contact with a catalyst composition consisting essenially of:

(a) a lithium allyl compound having 3–10 carbon atoms; and (b) a sodium secondary- or tertiary-alkoxide of no more than 10 carbon atoms or a potassium tertiary-alkoxide of 4–10 carbon atoms;

te concentration of said catalyst composition being 0.1–4 millimoles of catalyst per 100 grams of said monomer composition, and said alkoxide being present in said catalyst composition in a ratio of 1.5–2.5 moles per mole of lithium allyl, said polymerization being conducted for a period of at least one hour.

2. The process of claim 1 in which said temperature is no more than 70° C.

3. The process of claim 2 in which said conjugated diene is 1,3-butadiene.

4. The process of claim 2 in which said monomer composition is essentially all 1,3-butadiene.

5. The process of claim 4 in which said lithium allyl compound is lithium allyl.

6. The process of claim 4 in which said polymerization is conducted for at least ten hours.

7. The process of claim 4 in which said alkoxide is a sodium sec.-alkoxide.

8. The process of claim 5 in which said alkoxide is sodium isopropoxide.

9. The process of claim 8 in which said lithium allyl compound is lithium allyl.

10. The process of claim 9 in which said ratio of alkoxide to lithium allyl is approximately two.

11. The process of claim 10 in which said polymerization is conducted in hexane solution.

12. The process of claim 11 in which said monomer is in hexane solution at a concentration of 10–25 percent by weight.

13. The process of claim 1 in which said catalyst composition is present at a concentration of 0.3–1.0 millimoles per 100 grams of said monomer.

14. The process of claim 1 in which said monomer composition is dissolved in a liquid hydrocarbon having a boiling point no higher than 110° C.

15. The process of claim 14 in which said monomer composition is present at a concentration of 10–25 percent by weight.

16. The process of claim 15 in which said liquid hydrocarbon is n-hexane.

17. The process of claim 1 in which said temperature is no more than 70° C., said diene is essentially all 1,3-butadiene, said polymerization is conducted for at least ten hours and said alkoxide is a potassium tertiary-alkoxide.

18. The process of claim 17 in which said alkoxide is potassium t-butoxide.

19. The process of claim 18 in which said lithium allyl compound is lithium allyl.

20. The process of claim 19 in which said ratio of alkoxide to lithium allyl is approximately two.

21. The process of claim 20 in which said polymerization is conducted in hexane solution.

22. The process of claim 21 in which said monomer is in hexane solution at a concentration of 10–25 percent by weight.

References Cited

UNITED STATES PATENTS

| | | | |
|---|---|---|---|
| 2,797,208 | 6/1957 | Burke | 260—83.7 |
| 2,856,391 | 10/1958 | Diem | 260—94.2 |
| 3,265,680 | 8/1966 | Forman et al. | 260—94.2 |
| 3,265,680 | 8/1966 | Hedman et al. | 260—680 |
| 3,294,768 | 12/1966 | Wofford | 260—83.7 |
| 3,324,191 | 6/1967 | Wofford | 260—669 |
| 3,331,821 | 7/1967 | Strobel | 260—83.7 |

FOREIGN PATENTS

| | | | |
|---|---|---|---|
| 782,970 | 9/1957 | Great Britain | 260—94.2 |

OTHER REFERENCES

Ser. No. 143,169, Halasa.

Alfin Catalysts by Morton; Encyclopedia of Polymer Science & Technology, vol. I, pp. 629–637.

JOSEPH L. SCHOFER, Primary Examiner

W. F. HAMROCK, Assistant Examiner

260—83.7, 85.3, 431